C. G. SMITH

May 30, 1933. ELECTRICAL APPARATUS Re. 18,846

Original Filed July 30, 1923

Witness
M. B. Crozier

Inventor
Charles G. Smith
by his Attorneys
Van Cleve Fish Hildebrett & Carr.

Reissued May 30, 1933 Re. 18,846

UNITED STATES PATENT OFFICE

CHARLES G. SMITH, OF MEDFORD, MASSACHUSETTS, ASSIGNOR, BY MESNE ASSIGNMENTS, TO RAYTHEON, INC., OF CAMBRIDGE, MASSACHUSETTS, A CORPORATION OF MASSACHUSETTS

ELECTRICAL APPARATUS

Original No. 1,714,402, dated May 21, 1929, Serial No. 654,641, filed July 30, 1923. Application for reissue filed May 21, 1931. Serial No. 539,120.

The present invention relates to electrical apparatus and is more particularly concerned with a type of apparatus involving electrical conduction through a gaseous medium.

The object of this invention is to provide a gaseous conduction apparatus in which the electrical characteristics of the discharge may be readily controlled.

It will be obvious to those skilled in the art that it is desirable to be able to control the discharge of a gaseous conduction device, particularly for use in connection with the amplification or production of electrical oscillations. Heretofore these operations have been carried out ordinarily by the use of thermionic tubes involving the employment of a heated filament, a construction which is generally fragile and expensive. According to the present invention, the gaseous discharge is caused to take place between non-incandescent electrodes and is controlled by deflecting electrons from their normal paths through the gaseous region. This construction obviates the use of an incandescent filament with its attendant batteries and other disadvantages.

Figure 1:
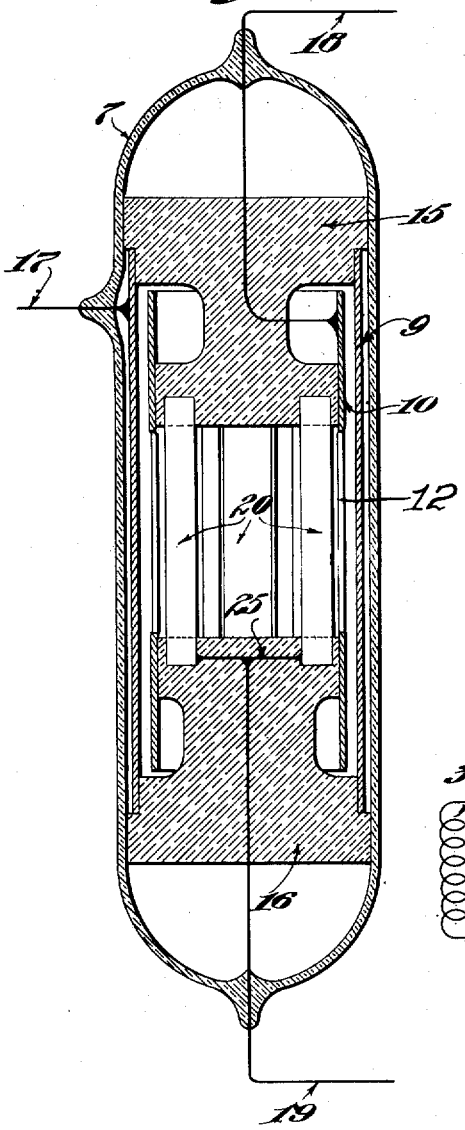
Figure 2:
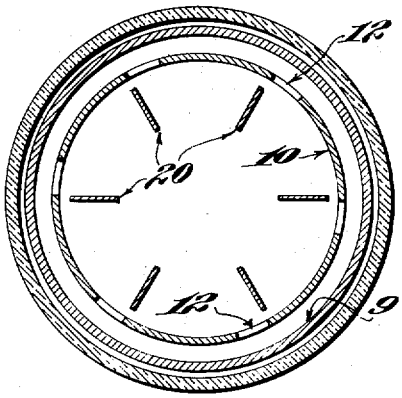
Figure 3:
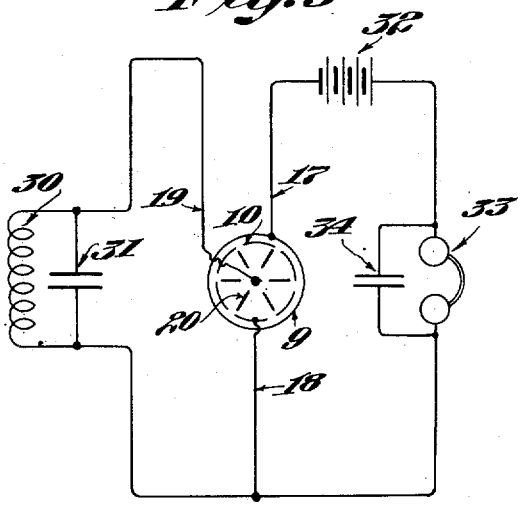

In the drawing illustrating the preferred form of the invention, Fig. 1 is an elevation in section of the improved gaseous conduction apparatus; Fig. 2 is a sectional plan view of the apparatus shown in Fig. 1; and Fig. 3 is a diagram of the improved apparatus employed in a circuit for the amplification of electrical oscillations.

As a basis for the present invention it is preferred to use the type of apparatus disclosed in the copending patent of Smith, No. 1,545,207, filed August 8, 1920, patented July 7, 1925. This application discloses a novel form of insulating device comprising a pair of electrodes spaced apart in a gas a distance which is short and comparable to the mean free path of the electrons in the gas, that is a distance such that electrons traveling directly across the gas space between the electrodes produce insufficient ionization to initiate substantial conduction, the mean free path of the electrons being understood to be the average distance traversed by the electrons without ionizing impact with gas molecules (or atoms.) Electrons which may be impelled between the electrode surfaces by an electric field are thus not allowed to take paths sufficiently long to cause gaseous ionization in the region between the electrodes. The preferred form of the present invention contemplates the provision of a series of slots in one of the electrodes in a manner to allow the passage of electrons therethrough with consequent opportunity for them to traverse long paths and ionize a sufficient number of gas molecules to cause conduction to take place. This conduction is effectively controlled by a third electrode having portions adjacent the slots and so located that a positive potential applied to the third electrode attracts electrons thereto and diminishes their paths to such an extent that ionization is reduced.

The illustrated embodiment of the invention comprises a receptacle 7 of glass or other insulating material having immersed therein a pair of concentric cylindrical electrodes 9 and 10 the distance between opposing electrode surfaces being short and comparable to the mean free path. The electrodes are supported at each end upon suitable insulating forms 15 and 16 maintained in the receptacle. According to the invention disclosed in the patent previously referred to, these insulating forms are so constructed that all paths for electrical conduction between the electrodes through the insulating supports are too long to permit of breakdown. The inner electrode 10 is provided with a plurality of longitudinal slots 12 extending between the supports 15 and 16. A third electrode for the control of the gaseous discharge comprises a series of fins 20 arranged radially and adjacent electrode 10 near the slots. It is preferable to mold the fins 20 directly in the support 16, a process which is readily carried out if the supports are formed of bakelite or similar material. The fins are connected by suitable wires indicated at 25 preferably embedded in the insulation. Suitable lead wires 17, 18 and 19 are attached to the electrodes 9, 10 and 20 and sealed into the glass receptacle in the manner shown. In the particular construction shown, electrode 9 normally functions as the cathode and 10 as the anode. Upon applying a potential difference between anode 10 and cathode 9, electrons are forced between the electrodes. There is no possibility of discharge directly between the opposing surfaces of the electrodes because the electron paths which extend directly between such surfaces are too short to allow a sufficient number of collisions with gas molecules to initiate ionization and conduction. However, a large number of electrons are impelled through the slots and impinge upon the inner surface of the anode. Their paths are thus made sufficiently long to allow of the formation of positive ions in the region enclosed by the anode. The positive ions so formed are drawn by the electric field to the cathode, where they liberate additional electrons, thereby initiating cumulative ionization. If now electrode 20 is made positive with respect to the anode 10, a number of the electrons will be drawn toward electrode 20, thereby curtailing their paths sufficiently to reduce the conducting properties of the device as a whole. The number of electrons drawn to the auxiliary electrode and the effect upon other electron paths in the region are dependent upon the magnitude of the positive potential applied to the auxiliary electrode, and accordingly any currents which may be caused to flow upon the application of a potential difference between electrodes 9 and 10 will vary in amplitude according to the potential applied to electrode 20.

This effect of controlling the gaseous discharge by means of an auxiliary electrode is capable of embodiment in a number of systems having great practical application, as for example in connection with the amplification of electrical oscillations. Such an amplifying circuit is illustrated in Fig. 3, showing an input circuit consisting of an inductance 30 and a condenser 31 connected directly between electrodes 10 and 20. The inductance 30 may be conveniently coupled to a wireless receiving antenna, a carrier wave telephone system, or any other source of high frequency alternations. Between the cathode 9 and anode 10 are connected a battery 32 and a pair of telephones 33, or any other signal indicating means. The telephones are preferably shunted by a by-pass condenser 34. The currents in the input circuit are amplified by virtue of the controlling effect of electrode 20 upon the gaseous discharge between the main electrodes. Furthermore, it will be apparent that this apparatus can be embodied in any of the systems now employing the three electrode thermionic vacuum tube. For example, by coupling the input and output circuits, the device may be made to produce oscillations of any desired frequency depending upon the constants of the cooperating circuits.

The invention having been described, what is claimed is:

1. An electrical apparatus comprising a gas filled receptacle, a cathode and an anode immersed therein and having opposing surfaces separated by distances which are too short to normally permit of gaseous ionization and conduction, one of the electrodes being provided with openings to permit of long electron paths therethrough, and electrostatic means other than said electrodes adjacent the openings for altering the lengthened paths in a manner to control the gaseous discharge.

2. An electrical apparatus comprising a receptacle filled with gas, a cathode immersed therein, an anode having a plurality of slots and having surfaces spaced from the surface of the cathode a distance of the order of magnitude of the mean free path of electrons in the gas, and electrostatic means adjacent said slots for controlling the passage of electrons through the openings in the anode.

3. An electrical apparatus comprising a gas filled receptacle, a cathode, an anode having a plurality of slots and having surfaces spaced from the cathode a distance of the order of magnitude of the mean free path of electrons in the gas, and a third electrode consisting of a plurality of connected fins spaced adjacent the slots in the anode for the purpose of controlling the passage of electrons between the anode and cathode.

4. In gaseous conduction apparatus comprising electrically cooperating cathode and anode electrodes spaced apart a distance which normally insulates, one of the electrodes being hollow and having inside and outside conducting surfaces and the other electrode being opposite one of said surfaces, and a third control electrode opposite the other of said surfaces.

5. A gaseous conduction device comprising a sealed vessel containing an ionizable gas, and a pair of main electrodes having extended surfaces disposed opposite each other within a distance of the order of the mean free path of electrons in the gas, one of said electrodes having perforations for effecting conduction of electricity through the body of gas between said electrodes, barrier means adjacent said electrodes for preventing electrons of the discharge from entering paths outside said perforations that are sufficiently long to produce ionization and gaseous conduction between said electrodes under the potentials applied thereto during operation, and an additional electrode disposed adjacent one of said electrodes within a distance inhibiting ionization of the gas therebetween to control the conduction in the space between said main electrodes upon variation of the potential applied to said additional electrode.

6. A gaseous conduction device comprising a sealed vessel containing an ionizable gas, a pair of main electrodes having extended electrode surfaces disposed opposite each other within a distance too short to permit gaseous ionization by the potential therebetween, one of said electrodes having perforations for effecting conduction of electricity through the body of gas between said electrodes, barrier means adjacent said electrodes for blocking ionization of gas along all paths outside said perforations that are sufficiently long to produce ionization and gaseous conduction between said main electrodes under the potentials applied therebetween during operation, an additional electrode disposed adjacent to one of said electrodes within a distance inhibiting ionization of the gas therebetween to vary the conduction of electricity through the body of gas between said main electrodes upon variation of the potential applied to said additional electrode.

7. A gaseous conduction device comprising a sealed vessel containing an ionizable gas, a pair of tubular electrodes surrounding each other and spaced apart within a distance of the order of the mean free path of electrons in the gas, one of said electrodes having perforations for effecting conduction of electricity through the body of gas between said electrodes, barrier means adjacent said electrodes for blocking ionization of gas along all paths outside said perforations that are sufficiently long to produce ionization and gaseous conduction between said main electrodes under potentials applied therebetween during operation, and an additional electrode mounted adjacent to one of said electrodes within a distance inhibiting ionization of the gas therebetween by potentials applied thereto, to vary the conduction of electricity through the gas between said main electrodes upon variation of the potential applied to said additional electrode.

In testimony whereof, I have hereunto subscribed my name this 19th day of May, 1931.

CHARLES G. SMITH.